United States Patent
Bush (10) Patent No.: US 11,689,476 B2
(45) Date of Patent: *Jun. 27, 2023

(54) SYSTEM AND METHOD FOR A TIME-SENSITIVE NETWORK

(71) Applicant: GE Aviation Systems LLC, Grand Rapids, MI (US)

(72) Inventor: Stephen Francis Bush, Latham, NY (US)

(73) Assignee: GE Aviation Systems LLC, Grand Rapids, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 17/854,309

(22) Filed: Jun. 30, 2022

(65) Prior Publication Data

US 2022/0337534 A1   Oct. 20, 2022

Related U.S. Application Data (62) Division of application No. 17/085,348, filed on Oct. 30, 2020, now Pat. No. 11,411,891.

(51) Int. Cl.
*H04L 49/253* (2022.01)
*H04L 47/2441* (2022.01)
(Continued)

(52) U.S. Cl.
CPC ............ *H04L 49/254* (2013.01); *H04L 45/02* (2013.01); *H04L 45/38* (2013.01); *H04L 47/2441* (2013.01); *H04L 49/351* (2013.01)

(58) Field of Classification Search
CPC ....... H04L 49/254; H04L 45/02; H04L 45/38; H04L 47/2441; H04L 49/351;
(Continued)

(56) References Cited

U.S. PATENT DOCUMENTS 6,826,152 B1   11/2004   Kroon
8,589,579 B2   11/2013   Samuels et al.
(Continued)

FOREIGN PATENT DOCUMENTS

JP           6039592 B2      12/2016
WO     WO-0056013 A2 *    9/2000    ............. H04L 12/46
WO       2018191109 A1     10/2018

OTHER PUBLICATIONS

Anna Arestova, Kai-Steffen Jens Hielscher, and Reinhard German, "Design of a Hybrid Genetic Algorithm for Time-Sensitive Networking", 2020, 19 pages, Switzerland.
(Continued)

*Primary Examiner* — Mohamed A Kamara
(74) *Attorney, Agent, or Firm* — McGarry Bair PC (57) ABSTRACT

A method for a time sensitive network (TSN) having a network topology is disclosed. The method includes determining a set of data flow permutations corresponding to the network topology, computing a respective full schedule corresponding to each data flow permutation of the set of data flow permutations, determining a respective time to compute the full schedule for each flow permutation of the set of data flow permutations, and computing a respective partial schedule for each data flow permutation of the set of data flow permutations. The method further includes selecting a data flow permutation of the set of data flow permutations based at least in part on the respective time to compute the full schedule for the selected flow permutation, and saving the selected data flow permutation to a memory.

20 Claims, 4 Drawing Sheets

(51) Int. Cl.
   *H04L 49/351*   (2022.01)
   *H04L 45/02*    (2022.01)
   *H04L 45/00*    (2022.01)

(58) Field of Classification Search
   CPC ..... H04L 47/781; H04L 45/66; H04L 47/521;
              H04L 47/50; H04L 41/12; H04L 47/22
   See application file for complete search history.

(56) References Cited

U.S. PATENT DOCUMENTS

| | | |
|---|---|---|
| 9,319,332 B2 | 4/2016 | Thubert et al. |
| 9,331,962 B2 | 5/2016 | Lida et al. |
| 9,705,700 B2 | 7/2017 | Ficara et al. |
| 10,270,567 B1 | 4/2019 | Rang et al. |
| 10,693,812 B2 | 6/2020 | Kandula et al. |
| 2005/0169174 A1 | 8/2005 | Apostolopoulos et al. |
| 2007/0071026 A1 | 3/2007 | Rogers |
| 2007/0211670 A1 | 9/2007 | Andersson |
| 2013/0117423 A1 | 5/2013 | Gupta et al. |
| 2017/0054828 A1 | 2/2017 | Ling et al. |
| 2018/0302331 A1 | 10/2018 | Bush |
| 2018/0316557 A1 | 11/2018 | Frangieh et al. |
| 2019/0379603 A1* | 12/2019 | Dhanabalan ............ H04L 47/29 |

OTHER PUBLICATIONS

Jorg Denzinger and Tim Offerman, "On Cooperation between Evolutionary Algorithms and other Search Paradigms", 1999, 8 pages, Germany.

* cited by examiner

SYSTEM AND METHOD FOR A TIME-SENSITIVE NETWORK

CROSS-REFERENCE TO RELATED APPLICATIONS

This application is a divisional of U.S. patent application Ser. No. 17/085,348, filed Oct. 30, 2020, now allowed, which is incorporated by reference herein in its entirety.

TECHNICAL FIELD

This disclosure relates generally to time sensitive networks, and more specifically to systems and methods for scheduling data flows in a time-sensitive network.

BACKGROUND

Various types of control systems communicate data between different sensors, devices, and user interfaces, etc., to enable control operations of other powered systems. For example, aircraft, locomotives, automobiles, surgical suites, power plants, etc., include many systems that communicate with each other using Industrial Ethernet networks in order to control operations of the aircraft, locomotives, automobiles, surgical suites, and power plants.

Industrial Ethernet networks are based on layer-2 (Ethernet), but add proprietary protocols to achieve real-time communication. Some systems can use a time-sensitive network (TSN) to communicate data using standard methods for time synchronization and traffic management, allowing deterministic communication over standard Ethernet networks between end-devices. The IEEE 802.1 TSN suite standardizes layer-2 communication so different networking protocols can provide deterministic communication while sharing the same infrastructure.

As Time-Sensitive Networks include more complex topologies, with redundant or dynamically changing links and large numbers of devices, rapid rescheduling of the communication flows between the devices becomes essential.

BRIEF DESCRIPTION OF THE DRAWINGS

A full and enabling disclosure of the present description, including the best mode thereof, directed to one of ordinary skill in the art, is set forth in the specification, which refers to the appended figures, in which.

DETAILED DESCRIPTION

The exemplary drawings are for purposes of illustration only and the dimensions, positions, order and relative sizes reflected in the drawings attached hereto can vary.

As used herein, the term "set" or a "set" of elements can be any number of elements, including only one. Additionally, as used herein, a "controller" or "controller module" can include a component configured or adapted to provide instruction, control, operation, or any form of communication for operable components to affect the operation thereof. A controller module can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), a hardware-accelerated logic controller (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. Non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transient, volatile or non-transient, or non-volatile memory.

As used herein a "topology" can refer to one or more arrangement(s) of a network which comprising a plurality of nodes and connecting lines (e.g., communication links, including wired communication links or wireless communication links) between devices (e.g. sender and receiver devices) in the network. Topologies may comprise, but are not limited to one or more of mesh, star, bus, ring, and tree topologies.

Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to affect a functional or operable outcome, as described herein. In another non-limiting example, a control module can include comparing a first value with a second value, and operating or controlling operations of additional components based on the satisfying of that comparison. For example, when a sensed, measured, or provided value is compared with another value, including a stored or predetermined value, the satisfaction of that comparison can result in actions, functions, or operations controllable by the controller module. As used, the term "satisfies" or "satisfaction" of the comparison is used herein to mean that the first value satisfies the second value, such as being equal to or less than the second value, or being within the value range of the second value. It will be understood that such a determination can easily be altered to be satisfied by a positive/negative comparison or a true/false comparison.

Example comparisons can include comparing a sensed or measured value to a threshold value or threshold value range.

Aspects of the disclosure can be implemented in any environment, apparatus, system, or method having a regulated, restricted, authorized, or otherwise limited "write-access" privileges to a memory or data store component. As used herein, "write-access" means availability or authorization to commit a change to a memory, the change being storing or overwriting data, values, commands, instructions, or any other data, element, or identifier to a memory location, regardless of the function performed by the data, element, or identifier, or regardless of the function or implementation of the environment, apparatus, system, or method. Collectively, "access" to data or "accessing" data can refer to either reading, viewing, or otherwise receiving data from a data store, "writing" data, as referenced above, or a combination thereof.

As used herein, the term "installed product" should be understood to include any sort of mechanically operational entity, asset including, but not limited to, jet engines, locomotives, gas turbines, and wind farms and their auxiliary systems as incorporated. The term is most usefully applied to large complex powered systems with many moving parts, numerous sensors and controls installed in the system. The term "installed" includes integration into physical operations, for example, such as the use of engines in an aircraft fleet whose operations are dynamically controlled, a locomotive in connection with railroad operations, or apparatus construction in, or as part of, an operating plant building, machines in a factory or supply chain, or the like. As used herein, the terms "installed product," and "powered system" can be used interchangeably. As used herein, the term "automatically" can refer to, for example, actions that can be performed with little or no human interaction.

To achieve desired levels of reliability, TSNs typically employ time synchronization, scheduling, and time-aware data traffic shaping. The data traffic shaping uses the schedule to control logical gating on switches in the network. The schedules for such data traffic in TSNs are often determined during an initial design phase based on the topology of the network and predetermined system requirements, and updated as necessary. For example, in addition to defining a TSN topology (including communication paths, bandwidth reservations, and various other parameters), a network-wide synchronized time for data transmission can be predefined. Such a plan for data transmission (e.g., time-triggered data traffic) on communication paths of the network is typically referred to as a "communication schedule" or simply "schedule".

It will be understood that when scheduling communications in a TSN, a tradeoff or balance between time and space, such as processing time to determine a schedule, and storage space (i.e., memory) to store the schedule is necessary. Pre-computing all possible schedules might result in fast operation, but typically requires an impractical amount of storage space. Conversely, not pre-computing any schedules would consume significantly less space, but would typically require an impractical amount of real-time processing to determine a schedule when needed.

It will be further understood that some portions of a schedule are typically more difficult or complex to compute than other portions of the same schedule. The more difficult to compute portions can be pre-computed offline and act as "seeds" or partial schedules for fast computation when needed. As used herein the term "full schedule" will be used to refer to a computed schedule and "partial schedule" will be used to refer to a portion of a full schedule. As described in more detail herein, aspects can determine and pre-compute, these "seeds" or partial schedules, enabling a tradeoff or balance between computation time and storage space, while ensuring full schedules can be quickly computed in real-time when necessary.

Each partial schedule can act as a hash for its corresponding full schedule. This enables the partial schedule to act as a unique lookup marker. This can advantageously save time when determining a full schedule, especially when there are a significant number of partial schedules for to be managed.

Time-critical communication between end devices in TSNs commonly includes "TSN flows" also known as "data flows" or simply, "flows." For example, data flows can comprise datagrams, such as data packets or data frames. Each data flow is unidirectional, going from a first or source end device to a second or destination end device in a system, having a unique identification and time requirement. These source devices and destination devices are commonly referred to as "talkers" and "listeners." Specifically, the "talkers" and "listeners" are the sources and destinations, respectively, of the data flows, and each data flow is uniquely identified by the end devices operating in the system. It will be understood that for a given network topology comprising a plurality of interconnected devices, a first set of data flows between the interconnected devices can be defined. For example, the first set of data flows can be between the interconnected devices. For the first set of data flows, various subsets or permutations of the dataflows can additionally be defined. As used herein, the term, "flow permutation" refers to a subset of the data flows (i.e., a subset of the first set of data flows) for the given network. It will be further understood, that for the given network topology comprising a plurality of interconnected devices, a set of flow permutations can additionally be defined, wherein each flow permutation in the set of flow permutations is a subset of the first set of data flows.

Ethernet switches (commonly called "bridges") transmit and receive the data (in one non-limiting example, Ethernet frames) in a data flow based on a predetermined time schedule. The bridges and end devices must be time-synchronized to ensure the predetermined time schedule for the data flow is followed correctly throughout the network.

The data flows within a TSN can be scheduled using a single device that assumes fixed, non-changing paths through the network between the talker/listener devices in the network. The TSN can also receive non-time sensitive communications, such as rate-constrained communications. In one non-limiting example, the single device can include an offline scheduling system or module.

Furthermore, the communications received by the TSN for transmission through the network cannot include indication of whether they are a time-sensitive communication or a non-time-sensitive communication. Not being able to provide indication makes it difficult to determine and schedule all TSN data flows in a network. Additionally, in some cases, end devices can be temporarily or permanently taken off-line or cease operation (for example, due to scheduled maintenance, or unexpected device failure), requiring new or updated data flows to be determined and scheduled quickly (for example, in real time) in order to maintain network operation. Due to the relatively large size and complexity of industrial networks, and the relatively large number of possible topologies for the network, determining and scheduling TSN data flows for the network in real time presents many challenges.

For example, conventional TSN scheduler modules typically lack sufficient processing or computing capacity to pre-compute all possible data flow permutations or determine schedules within time constraints necessary for continuous TSN operation, or both. Conventional TSN scheduler modules further lack sufficient memory to store all possible pre-computed data flows and schedules. Accordingly, it is desirable to minimize scheduling time for data flows due to changes in network topology in real time.

Aspects described herein provide a method of generating schedules for a TSN. The method can include "pre-computing" for the possible network topologies, corresponding data flow permutations, and schedules for the determined network topologies before they can be needed. The memory space required to store the determined data flows and schedules, and the time to compute the schedules for the data flows, can likewise be determined. Depending on the memory storage space required, and the time required to determine or compute the schedule for a given data flow, one or more of the determined data flows can be selected and saved and identified with a corresponding assigned hash to uniquely identify each saved data flow corresponding to the determined schedules. In the event of a subsequent change in the network topology (i.e., to a new topology), a saved data flow corresponding to the new topology can be readily identified, and a schedule determined or calculated accordingly based on the saved data flow.

More specifically, the method includes defining a predetermined topology or set of topologies for a network. Each network topology can include a set of "raw data" corresponding to a respective predetermined topology of the network. As used herein, the term "raw data" can refer to all or at least a portion of the data necessary to compute or determine a data flow for a given topology for the TSN. For example, the raw data can include, but is not necessarily limited to, all talker-listener devices in the network topology, the corresponding talker-listener data flows, maximum acceptable message delivery times for all data flows, and predetermined message sizes for each data flow for each respective topology. The method can include calculating or determining a full schedule for a set of all possible data flow permutations (e.g., comprising a number "F" of data flows), each data flow corresponding to a given network topology, and being based on the respective raw data for the network topology. The amount of time to calculate or determine the full schedule for each respective data flow of the set of data flows can be measured or determined and saved to memory.

For example, the method can include computing (e.g. via a digital twin) a first full schedule for a first data flow of the set of data flows based on a first set of raw data. The first full schedule can comprise a first full schedule data file that includes the computed first schedule data and the first data flow data. A partial first schedule data file can also be saved to memory that includes only the computed first schedule data (i.e., with the first data flow data omitted). The total size or amount of memory to save or store the first full schedule data file and the first partial schedule data file can be determined for the first data flow. It will be appreciated that for the first data flow, a first data triplet can be defined comprising the time to determine the full schedule for the first data flow, the memory space to save the first full and first partial schedule files, and the number of data flows processed (i.e., one).

The above steps can be repeated for a second data flow. That is, a second full schedule for a second data flow of the set of data flows can be computed based on the set of raw data. The second full schedule can comprise a second full schedule data file that includes the computed second schedule data and the second data flow data. A partial second schedule data file can also be saved to memory that includes only the computed second schedule data (i.e., with the second data flow data omitted). The total size or amount of memory to save or store the second full schedule data file and the second partial schedule file can be determined for the second data flow. It will be appreciated that for the second data flow, a second data triplet can be defined comprising the time to determine the full schedule for the second data flow, the memory space to save the second full and second partial schedule files, and the number of data flows processed (i.e., two).

The above steps can be further repeated as necessary for all F data flows in the set of data flows (i.e., all permutations of data flows). This provides or defines the schedule calculation time and memory space, and count of flows-processed for all possible permutations of data flows. It will be appreciated that for the set of data flows, a corresponding data triplet can be defined comprising the time to determine the full schedule for the set of data flows, the memory space to save the full and partial schedule files for the set of data flows, and the number of data flows processed (i.e., F).

Additionally, based on the foregoing steps, the calculation time to compute the full schedule for a given permutation "N" of the set of F data flows can be determined, and the difference in full schedule calculation time from the first N data flows to the remaining (i.e., F-N) flows can likewise be readily determined. Thus, a designer or operator of a given TSN, having a finite amount of available long-term memory space and computing capability, can make determinations as desired, based on trade-offs between processing or schedule calculation time for the remaining F-N flows and memory space suitable for long-term storage in the specific hardware and application of the TSN.

For example, depending upon a known or predicted likelihood of various components or end devices of the TSN to fail in service, the full schedule for any desired number of selected data flows can be pre-computed or pre-determined. In one non-limiting example, the full schedule for selected data flows can be pre-determined based on an anticipated failure of an end device for network topologies resulting from a failure of the end device. Each selected data flow can then be assigned or identified by a hash of the corresponding data flow schedule to enable quick identification and loading when required. Any number of the selected data flows can be loaded in memory on a network controller such as a TSN Centralized Network Configurator (CNC). In some aspects, all of the selected data flow permutations can be loaded in memory on the CNC. In other aspects, a portion of the set of data flows can be selected, for example based on a predetermined tradeoff between processing time and memory, and saved on the CNC. In the event of a change in the TSN topology, (e.g., an end device failure) to a new topology, the required data flow can be identified or selected, (e.g., using the appropriate assigned hash) and the full schedule can be calculated or computed based on the selected data flow.

Figure 1:
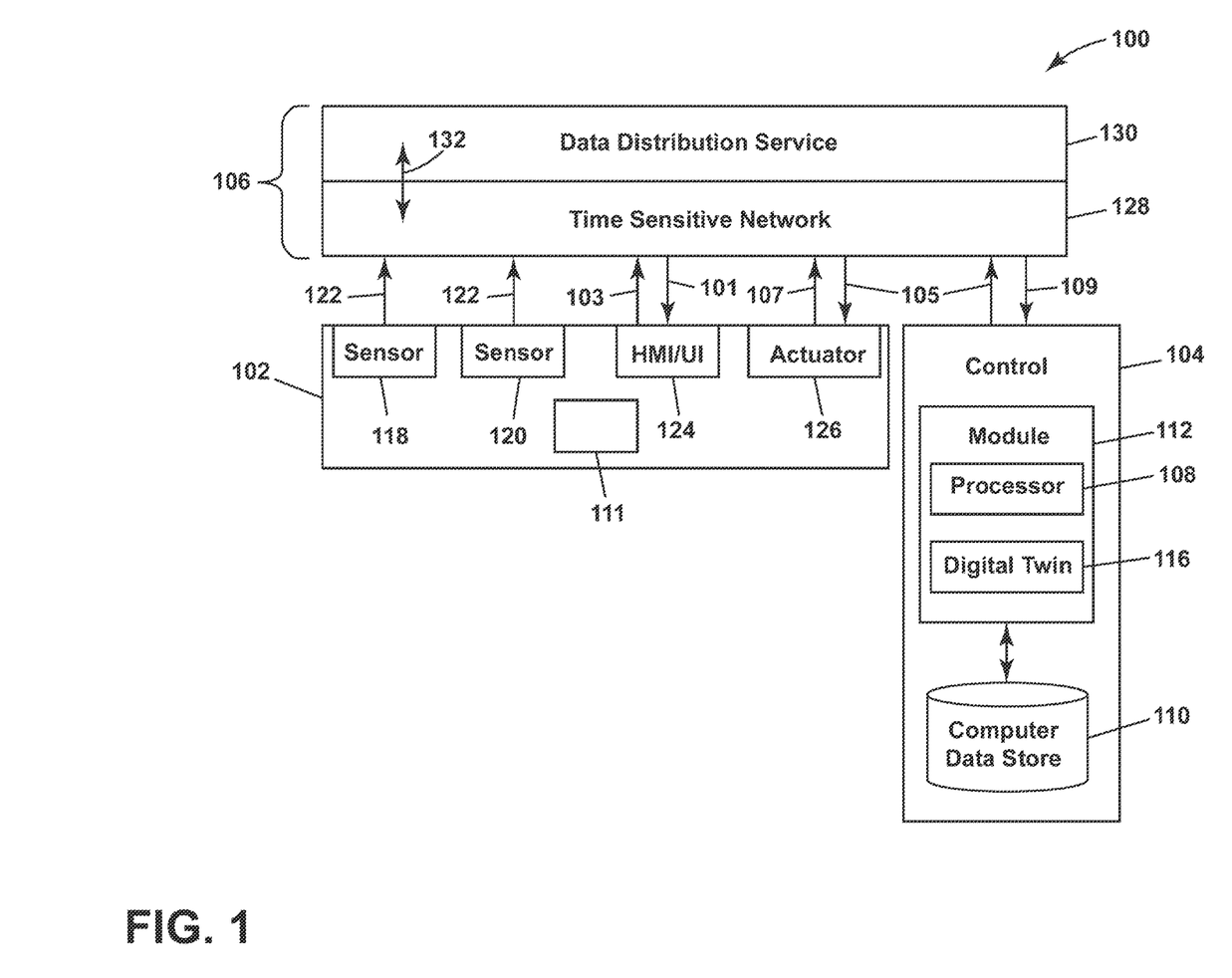
FIG. 1 illustrates a schematic system in accordance with aspects as described herein.

FIG. 1 illustrates a block diagram of a system 100 architecture in accordance with some aspects. The system 100 can include at least one installed product 102. As noted above, the installed product 102 can be, in various aspects, a complex mechanical entity such as the production line of a factory, a gas-fired electrical generating plant, a jet engine on an aircraft amongst a fleet (e.g., two or more aircraft), a wind farm, a locomotive, etc.

In various aspects, the installed product 102 can include any number of end devices, such as sensors 118, 120, a user platform device 24 such as a human machine interface (HMI) or user interface (UI) 124, and one or more actuators 126. As used herein, the term "actuator" can broadly refer to devices, components, modules, equipment, machinery, or the like that function to perform tasks or operations associated with operation of the installed product 102. In aspects, the installed product 102 can further include one or more software applications 111.

The installed product 102 can further comprise a control system 104 that controls operations of the installed product 102 based on data obtained or generated by, or communicated among devices of the installed product 102 to allow for automated control of the installed product 102 and provide information to operators or users of the installed product 102. In non-limiting aspects, the control system 104 can comprise a Central network controller (CNC). The control system 104 can define or determine the schedule on which all TSN the data frames are transmitted.

The control system 104 can include a memory or computer data store 110 and a Time Sensitive Network (TSN) module 112. The TSN module 112 can include a digital twin 116, and one or more processor or processing modules 108 (e.g., microprocessors, integrated circuits, field programmable gate arrays, etc.) that perform operations to control the installed product 102. The processing module 108 can, for example, be a conventional microprocessor, and can operate to control the overall functioning of the TSN module 112.

The data store 110 can provide information to a TSN module 112 and can store results from the TSN module 112. The data store 110 can comprise any combination of one or more of a hard disk drive, RAM (random access memory), ROM (read-only memory), flash memory, etc. The data store 110 can store software that programs the processing module 108 and the TSN module 112 to perform functionality as described herein.

The TSN module 112, according to some aspects, can access the data store 110 and utilize the digital twin 116 to create a prediction or result (e.g., a predicted schedule or data flow) that can be transmitted back to the installed product 102 as appropriate (e.g., for display to a user, operation of the installed product, operation of another system, or input to another system).

The system 100 can further include a communication system 106. The communications system 106 can be used by the control system 104 to communicate data between or among devices of the control system 104 or the installed product 102 that is controlled by the control system 104, or both. As used herein, the communication system 106 can include wired communication examples, wireless communication examples, or a combination thereof.

The communication system 106 can supply data (e.g., via a data flow) from at least one installed product 102 and the data store 110 to the TSN module 112. The TSN module 112 can receive one or more data frames and determine a classification for each received data frame. Based on the classification, the TSN module 112, in one or more aspects, can generate a schedule to transmit each data frame through the communication system 106, and then can transmit the data frames based on that schedule. The control system 104 can control one or more operations of the installed product 102 based on the transmitted data or data frame(s).

In some aspects, the communication system 106 can supply output from the TSN module 112 to at least one of user platforms such as HMI/UI 124, back to the installed product 102, to other systems or a combination thereof. In some aspects, signals or data received by the user platform 124, installed product 102 and other systems can modify the state or condition or another attribute of one or more physical elements or end devices of the installed product 102.

The HMI/UI 124 can communicate via the communications system 106. For example, the HMI/UI 124 can receive data 101 that is to be presented to a user or operator of the communication system 106 or control system 104 and that can communicate input data 103 received from the user or operator to one or more other devices of the control system 104. The HMI/UI 124 can comprise a display device, a touchscreen, laptop, tablet computer, mobile phone, speaker, haptic device, or other device that communicates or conveys information to a user or operator.

In aspects the sensors 118, 120 can comprise any conventional sensor or transducer. For example, in an aspect, at least one of the sensors 118, 120 can comprise a camera that generates video or image data, an x-ray detector, an acoustic pick-up device, a tachometer, a global positioning system receiver, a wireless device that transmits a wireless signal and detects reflections of the wireless signal in order to generate image data, or another device.

The one or more actuators 126, (e.g., devices, equipment, or machinery that move to perform one or more operations of the installed product 102 that is controlled by the control system 104) can communicate using the communication system 106. Non-limiting examples of actuators 126 include brakes, throttles, robotic devices, medical imaging devices, lights, turbines, etc. The actuators 126 can communicate status data 107 of the actuators 126 to one or more other devices of the installed product 102 via the communication system 106. The status data 107 can represent a position, state, health, or the like, of the actuator 126 sending the status data 107. The actuators 126 can receive command data 105 from one or more other devices of the installed product or control system via the communication system 106. The command data 105 can represent instructions that direct the actuators 126 how and/or when to move, operate, etc.

The control system 104 can communicate a variety of data between or among the end devices via the communication system 106 in response to the one or more software applications 111. For example, the control system 104 can communicate the command data 105 to one or more of the devices and/or receive data 109, such as status data 107 and/or sensor data 122, from one or more of the devices.

The communication system 106 can communicates data between or among the devices and control system 104 using a TSN network 128 that can communicate data using a data distribution service 130. As will be understood, the data distributions service 130 can be a network "middleware" application that facilitates configuring publishers and subscribers on a network. In other aspects, other middleware applications can be used. In still other aspects, the data distribution service 130 can be omitted, and the software application(s) 111 can manage the installed product 102 (and its devices) without use of the data distribution service 130.

The data distribution service 130 can represent an object management group (OMG) device-to-device middleware communication standard between the devices and the network. The data distribution service 130 can allow communication between publishers and subscribers. The term publisher can refer to devices 118, 120, 124, and 126 that send data to other devices 118, 120, 124, 126 and the term subscriber refers to devices 118, 120, 124, and 126 that receive data from other devices 118, 120, 124, and 126. The data distribution service 130 can operate on a variety of networks, such as Ethernet networks as one non-limiting example. The data distribution service 130 can operate between the network through which data is communicated and the applications communicating the data (e.g., the devices 118, 120, 124, and 126). The devices 118, 120, 124, and 126 can publish and subscribe to data over a distributed area to permit a wide variety of information to be shared among the devices 118, 120, 124, and 126.

In one aspect, the data distribution service 130 is used by the devices 118, 120, 124, and 126 to communicate data 101, 103, 105, 107, 109, 122 through the TSN network 128, which can operate on an Ethernet network of the installed product. The TSN network 128 can be at least partially defined by a set of standards developed by the Time Sensitive Networking Task Group, and includes one or more of the IEEE 802.1 standards.

A TSN-based deterministic network, including but not limited to an Ethernet network, can dictate (i.e., schedule) when certain data communications occur to ensure that certain data frames or packets are communicated within designated time periods or at designated times. Data transmissions within a TSN-based Ethernet network can be based on a global time or time scale of the network that can be the same for the devices in, or connected with, the network, with the times or time slots in which the devices communicate being scheduled for at least some of the devices.

The TSN network 128 is shown in FIG. 1 as a time sensitive network, but alternatively can be another type of network. For example, devices, including those associated with the system 100 and any other devices described herein, can exchange information via any TSN network which can be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a "Wireless LAN network, or an Internet Protocol ("IP") network such as the Internet, an intranet, or an extranet. It is contemplated that any devices described herein can communicate via one or more such communication networks.

As will be appreciated that in various non-limiting aspects, TSN network 128 can include various types of physical media including copper, optical fiber, wires including Wi-Fi and 5 G, and wave guide acoustical channels among many others.

In various aspects, the devices 118, 120, 124, 126 can communicate the data 122, 103, 101, 107, 105, 109 using the data distribution service 130. As will be understood, the TSN network 128 can include communication links communicatively coupling node devices. For example, in one non-limiting aspect, the devices 118, 120, 124, 126 can be node devices. The TSN network 128 can be configured to operate as a TSN and can include the devices 118, 120, 124, 126 (e.g., communicatively coupled with each other via the communication links. The communication links are connections over or through which data flows, data packets, frames, datagrams or a combination thereof can be communicated between the node devices.

In aspects, the node devices can include routers, switches, repeaters, or other devices capable of receiving data frames or packets and sending the data frames or packets to another node device. The communication links can be wired or wireless connections between the node devices.

The data can be communicated in the TSN network 128 as data frames or data packets. The data frames or packets can be published by a device 118, 120, 124, 126 and received by another device 118, 120, 124, 126 according to a network or communication schedule. For example, one or more of the data frames or packets of the data can be published by the sensor 118 can be sent to the TSN network 128 and subscribed to by the control system 104. The data frames or packets can hop from the sensor 118 to the control system 104 by being communicated from the sensor 118 to the various node devices and then the control system 104 in accordance with the determined schedule.

Figure 2:
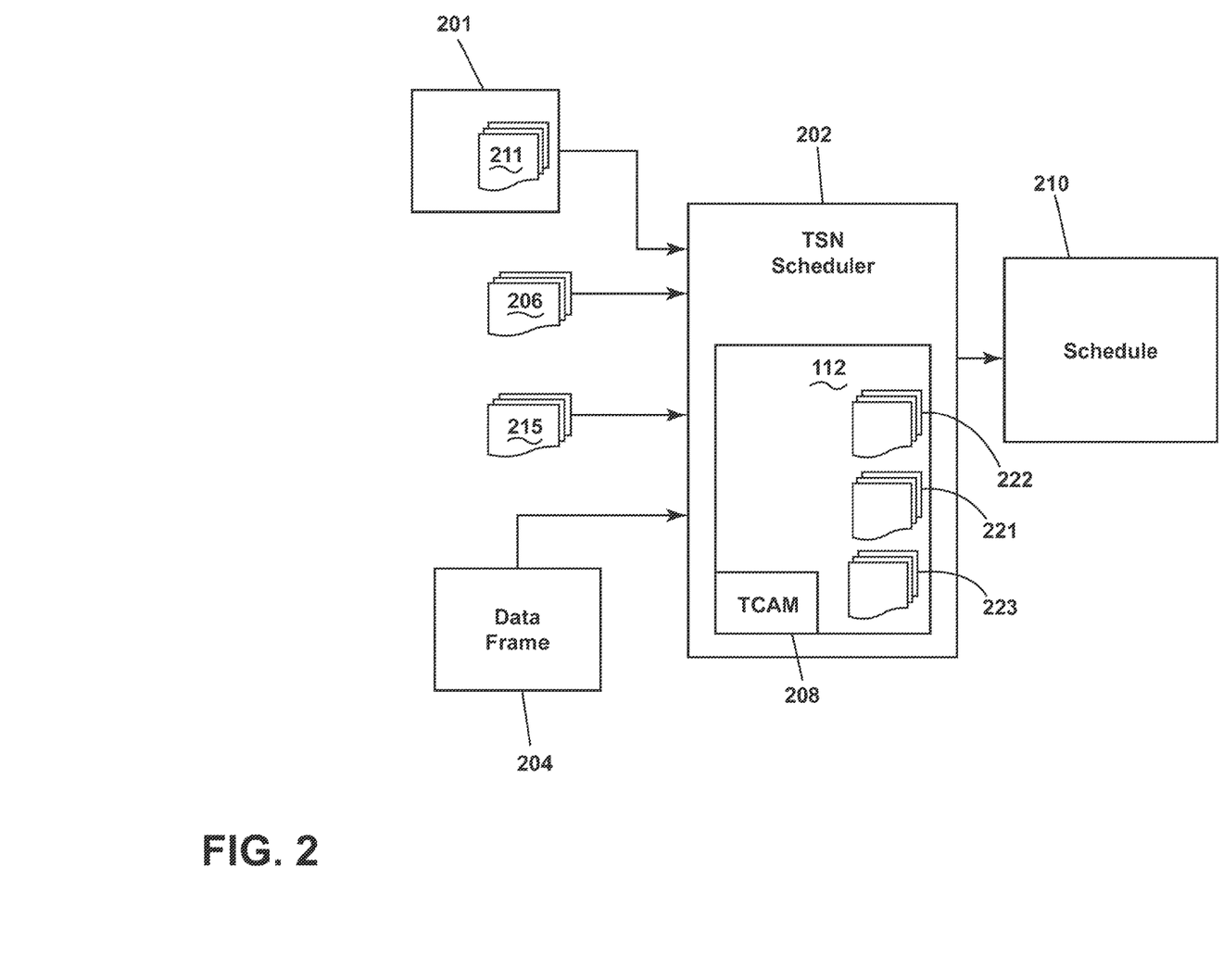
FIG. 2 illustrates a schematic block diagram of a portion of the schematic system of FIG. 1, in accordance with aspects as described herein.

Turning to FIG. 2, a block diagram of an example of operation of a portion of the system 100 of FIG. 1 in accordance with aspects of the disclosure, is provided. The system 100 can comprise the TSN module 112 including a scheduler 202 to schedule communication traffic. In non-limiting aspects the communication traffic can include data packets comprising one or more data frames 204. The data frames 204 can be received by the TSN module 112 or control system 104 at a switch (not shown) and provided to the scheduler 202. The scheduler 202 is configured to generate a schedule 210 for transmission of the data frames 204. As will be described in more detail herein, the schedule 210 can comprise a full schedule 222, and can be based on a computed partial schedule 221. In some non-limiting aspects, the partial schedule 221 can be computed by a separate computing device and provided to the scheduler 202. In one or more aspects, the schedule 210 can include a transmission time for the data frames 204. The scheduler 202 can also receive a description of the network topology 201 and data flow path or link requirements 206 (e.g., an indication of time sensitive paths, maximum latencies, physical link bandwidths, size of frames ("payload"), and frame destination) from an application (not shown), or any other suitable source. The description of the network topology 201 can include a corresponding set of raw data 211. In non-limiting aspects, the raw data 211 can include, for example, all talker-listener devices in the network topology 201, the corresponding talker-listener data flows, maximum acceptable message delivery times for all data flows, Quality of Service (QoS) parameters, and predetermined message sizes for each data flow for each respective topology 201. In an aspect, the TSN module 112 can determine a set of data flow permutations 215 based on the description of the network topology 201 and the respective set of raw data 211. In other aspects, the set of data flow permutations 215 can be determined by another computing device and provided to the control system 104.

In aspects, the scheduler 202 can communicate with all switches and end systems (e.g., devices of the installed product 102) to configure them. For example, the TSN module 112 can include a Ternary Content Addressable Memory (TCAM) 208. The TCAM 208 can be defined to operate on a specific physical port, a set of ports, or all of the ports in a network. The TCAM 208 can receive the data packet from one or more devices 118, 120, 124 and 126 and can divide the packet into the one or more data frames 204. Each data frame 204 can be temporarily placed in the TCAM 208, where one or more rules are applied to the data frame 204, before the data frame 204 is moved out of the TCAM 208 to an appropriate transmission queue Conventionally, the data frame 204 is standardized and can include a header with reserved fields. The header can include a destination address, a source address and an Ethernet type. The data frame 204 can also include data (e.g., a payload).

In one or more aspects, the schedule 210 can include the transmission times for the data frame 204 (e.g., the time a gate will open to release the data frame 204, for transmission to a destination node. The schedule 210 can include a determined communication pathway for each data frame 204 (e.g., to avoids contention with other data frames 204). The schedule 210 can optionally include other suitable information.

Figure 3:
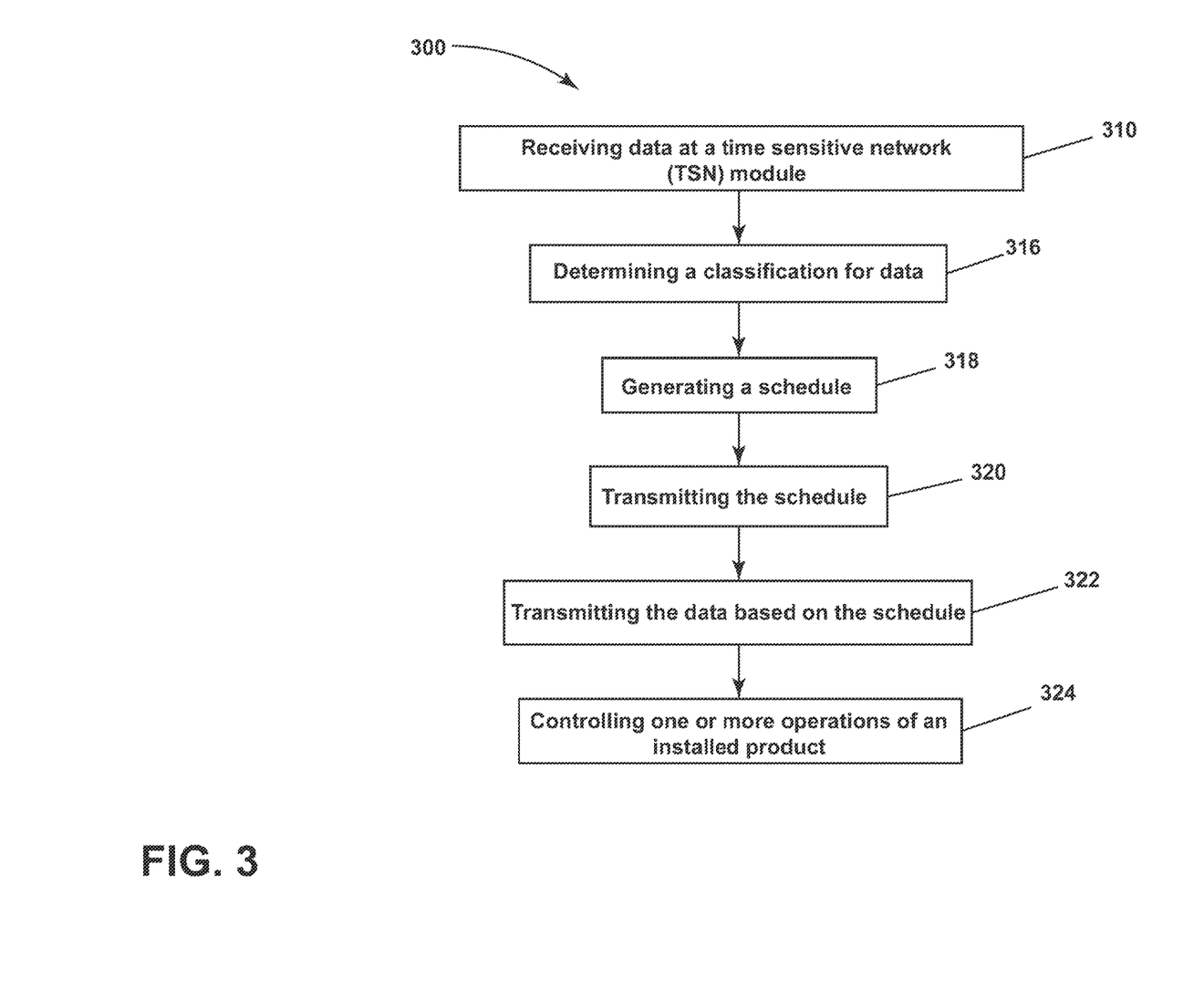
FIG. 3 illustrates a process flow diagram of an operation of the system of FIGS. 1 and 2, in accordance with aspects as described herein.

FIG. 3 provides a flow diagram of a method 300, according to an aspect. Method 300, and any other process described herein, can be performed using any suitable combination of hardware (e.g., circuit(s)), software or manual means. For example, a computer-readable storage medium can store thereon instructions that when executed by a machine result in performance according to any of the aspects described herein. In one or more aspects, the system 100 is conditioned to perform the method 300 such that the system is a special-purpose element configured to perform operations not performable by a general-purpose computer or device. Software embodying these processes can be stored by any non-transitory tangible medium including a fixed disk, a floppy disk, a CD, a DVD, a Flash drive, or a magnetic tape. Examples of these processes will be described below, with respect to aspects of the system 100, but other aspects are not so limited.

Initially, at 310, data comprising one or more data packets, made of one or more data frames 204, are received at a TSN module 112 within the scheduler 202. A classification can be determined for the data frames, at 316. Then, at 318, a schedule 210 is generated by the scheduler 202. In one or more aspects, the schedule 210 can be based on the description of the network topology 201 and path or link requirements 206.

The schedule 210 can be transmitted at 320. In one or more aspects, the schedule 210 can be downloaded onto all of the devices 104, 118, 120, 124, and 126 and switches in the TSN network 128. The schedule 210 can be executed i.e., the one or more data frames 304 transmitted through the TSN network 128, based on the schedule 210, at 322. One or more operations of the installed product 102 can be controlled based on the transmitted data frames 204, at 324.

Figure 4:
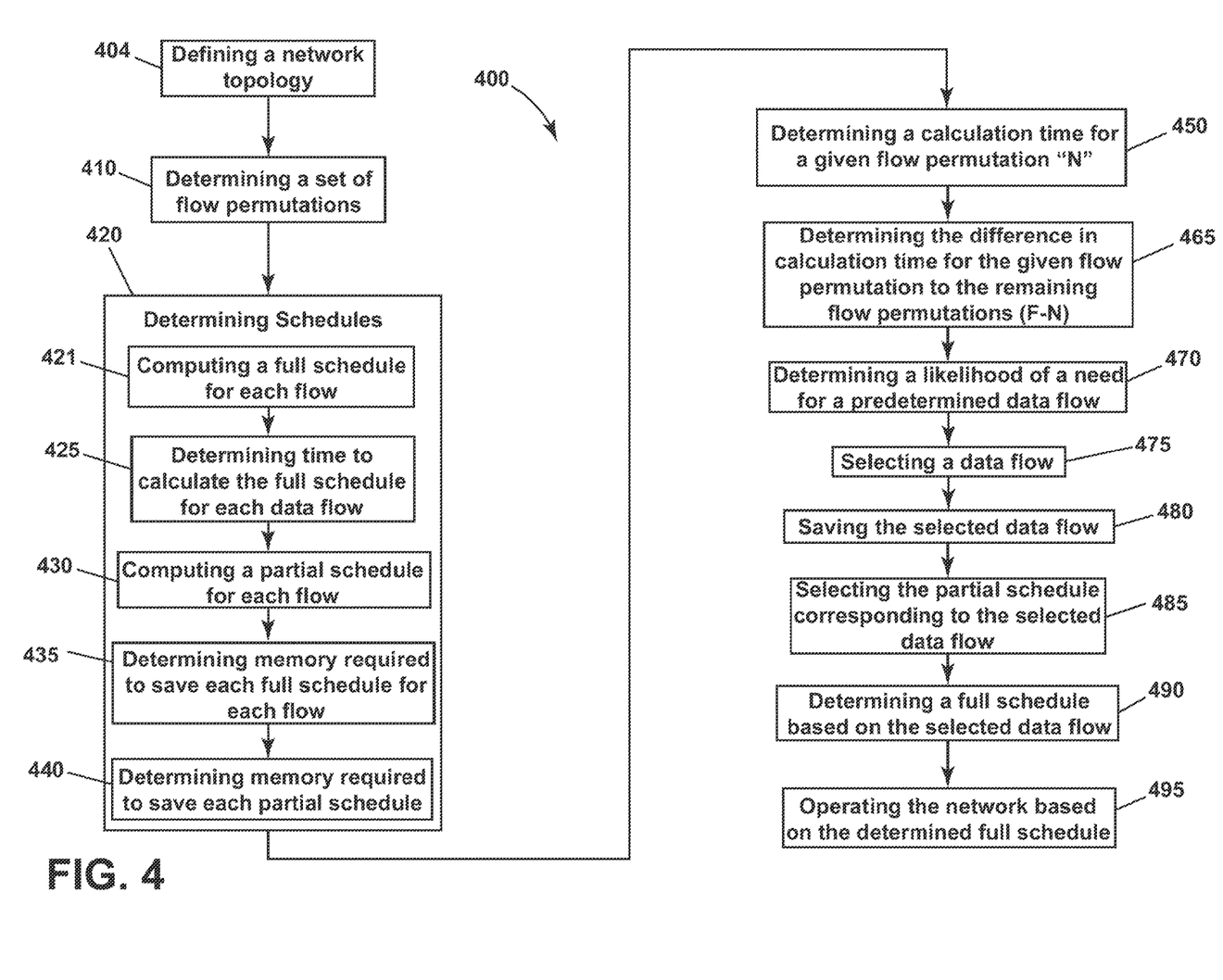
FIG. 4 illustrates a process flow diagram of an operation of the system of FIG. 1, in accordance with aspects as described herein.

Turning to FIG. 4, a flow diagram, of an example of an operation of a method 400 in accordance with an aspect is provided. Method 400, and any other process described herein, can be performed using any suitable combination of hardware (e.g., circuit(s)), software or manual means. For example, a computer-readable storage medium can store instructions that, when executed by a machine, result in performance according to any of the aspects described herein. In one or more aspects, the system 100 can be conditioned to perform the method 400 such that the system is a special-purpose element configured to perform operations not performable by a general-purpose computer or device. Software embodying these processes can be stored by any non-transitory tangible medium including a fixed disk, a floppy disk, a CD, a DVD, a Flash drive, or a magnetic tape.

In aspects, method 400 includes defining a topology 201 or set of topologies 201 of the TSN network 128, at 404. For example, in an aspect, the set of topologies 201 of the TSN network 128 can be predetermined topologies 201 comprising all logical permutations or variations of the topologies 201 of the TSN network 128. Each topology 201 can be calculated or determined by the control system 104. In other aspects, each topology 201 of the TSN network 128 can be determined by a separate computing device and provided to the control system 104 to be saved in the data store 110. In non-limiting aspects, each topology 201 of the TSN network 128 can include a corresponding set of raw data 211. In non-limiting aspects, the raw data 211 can include, but is not necessarily limited to, all talker-listener devices in the network topology 201, the corresponding talker-listener data flows, maximum acceptable message delivery times for all data flows, Quality of Service (QoS) parameters, and predetermined message sizes for each data flow for each respective topology 201.

The method 400 can also include calculating or determining a set of data flow permutations 215 (e.g., comprising a number "F" of data flows), at 410 corresponding to each network topology 201. In various aspects, each data flow can correspond to a given network topology 201, based on the respective raw data 211 for the network topology 201. In an aspect, the set of data flow permutations 215 can be determined by the control system 104. In other aspects, the set of possible data flow permutations 215 can be determined by a separate computing device and provided to the control system 104 to be saved in the data store 110 or memory.

The method 400 can include a determining a set of full schedules 222 and a corresponding set of partial schedules 221 at 420. For example, the determining a set of full schedules 222 and a set of partial schedules 221 can include computing (e.g. via the digital twin 116) a respective full schedule 222 for each data flow of the set of data flows based on a corresponding set of raw data 211, at 421. Each respective full schedule 222 can comprise a respective full schedule 222 data file that includes the computed first schedule 222 data and the first data flow data. The amount of time to calculate or determine the full schedule 222 for each respective data flow of the set of data flows can be measured or determined at 425. In non-limiting aspects, the time to determine a full schedule 222 for each respective data flow of the set of data flows can be saved to the memory or data store 110.

Likewise, a partial schedule 221 comprising a partial schedule 221 data file can be determined for each respective data flow of the set of data flows, at 430. In non-limiting aspects, each partial schedule 221 data file can include the corresponding computed full schedule 222 data only (i.e., with the first data flow data omitted). The total size or amount of memory to save or store the respective full schedule 222 data file can optionally be determined at 435. The total size or amount of memory to save or store the corresponding partial schedule 221 data file can optionally be determined for each partial schedule 221 at 440. Each full schedule 222 and partial schedule 221 data file can be saved to memory 110. It will be appreciated that when determining the full schedule 222 and partial schedule 221 for each data flow at 420, a data triplet can be defined comprising the time to compute the full schedule 222 for the respective data flow, the memory space to save the respective full schedule 222 and corresponding partial schedule 221 data files, and the number of data flows processed.

For example, in one aspect, the determining a set of full and partial schedules 222, 221 at 420 can include computing a first full schedule for a first data flow of the set of data flows based on a first set of raw data 211, at 421. The first full schedule 222 can comprise a first full schedule 222 data file that includes the computed first schedule 222 data and the first data flow data. A first partial schedule 221 data file can also be computed at 430, that includes the computed first schedule data with the first data flow data omitted. A first amount of memory to save or store the first full schedule 222 data file and a second amount of memory to save the first partial schedule 221 data file can then readily be determined for the first data flow at 435, 440. For the first data flow, a first data triplet can be defined comprising the time to determine the full schedule 222 for the first data flow, the memory space to save the first full and first partial schedule 222, 221 files, and the number of data flows processed (i.e., one).

The above steps 425-440 can be repeated for a second data flow. That is, a second full schedule 222 for a second data flow of the set of data flows can be computed based on the set of raw data 211, at 425. The second full schedule 222 can comprise a second full schedule 222 data file that includes the computed second schedule data and the second data flow data. A second partial schedule 221 data file can also be determined at 430 that includes the computed second schedule data with the second data flow data omitted. The total size or amount of memory to save or store the second full schedule 222 data file and the second partial schedule 221 data file can be determined for the second data flow at 435, 440. It will be appreciated that for the second data flow, a second data triplet can be defined comprising the time to determine the full schedule 222 for the second data flow, the memory space to save the second full and second partial schedule 222, 221 data files, and the number of data flows processed (i.e., two).

The above steps can be further repeated as desired for all F data flows in the set of data flows (i.e., all permutations of data flows). This provides or defines the full schedule 222 calculation time, memory space, and count of flows-processed for all possible permutations of data flows. It will be appreciated that for the set of data flows, a data triplet can be defined comprising the time to determine the full schedule 222 for set of data flows, the memory space to save the full and partial schedule 222, 221 data files for the set of data flows, and the number of data flows processed (i.e., F).

Additionally, based on the foregoing steps, the calculation time for full schedule 222 for a given flow permutation "N" of the set of F data flows can be determined at 450, and the difference in full schedule calculation time from the first N data flows to the remaining (i.e., F-N) flows can be readily determined, at 465.

In non-limiting aspects, a likelihood of a need for a predetermined data flow permutation 215 can be determined at 470. For example, in an aspect, the determined likelihood of the need for a predetermined data flow permutation 215 can be based at least in part on an anticipated change to the network topology 201. In aspects, the anticipated change to the network topology 201 can be based on a likelihood of a failure of a predetermined device, or an anticipated shutdown period for a device, for example for scheduled maintenance.

The method 400 can further include selecting one or more flow permutations 215 at 475, and saving the selected one or more flow permutations 215 in the data store 110 at 480. The selection of the one or more flow permutations 215 can be based on at least one of the full schedule calculation time for the selected flow permutation 215, the calculation time for the remaining flow permutations 215, the first amount of memory to save full schedule for the selected flow, the second amount of memory to save the partial schedule 221 for the selected flow, the difference between the respective time to compute the full schedule for the selected flow permutation 215 and the total time required to compute the full schedule for the remaining flow permutations 215. For example, the selection can be based on a predetermined trade-off criterion between processing or schedule computation time for the remaining F-N flows and long-term memory space of the TSN. In other aspects, the selection of the one or more flow permutations 215 can additionally or alternatively be based on the determined likelihood of the need for the selected data flow permutation 215. The partial schedule 221 corresponding to the selected data flow permutation 215 can be selected at 485. For example, in non-limiting aspects, a hash can be assigned to correlate the selected dataflow permutation 215 and the respective partial schedule 221 corresponding to the selected dataflow. In non-limiting aspects, the corresponding partial schedule 221 associated with the selected dataflow permutation 215 can be readily identified based on the assigned hash.

In the event of a change in the TSN network topology 201, (e.g., resulting from the failure of the end devices), a selected data flow of the one or more data flows saved to memory can be selected, and the corresponding partial schedule 221 identified by the assigned hash, and loaded from memory for implementation. A corresponding full schedule can be readily determined at 490 based on the selected data flow and the corresponding partial schedule 221. Any number of the pre-determined data flows can be loaded in memory on the control system 104. In some aspects, all of the pre-determined data flow can be loaded in memory on the TSN. The determined full schedule can then be implemented by the control system 104. The method 400 can concluded by operating the network with the control system 104 in accordance with the determined full schedule at 495.

The sequence depicted are for illustrative purposes only and is not meant to limit the methods 300, 400 in any way as it is understood that the portions of the method can proceed in a different logical order, additional or intervening portions can be included, or described portions of the method can be divided into multiple portions, or described portions of the method can be omitted without detracting from the described method.

Many other possible aspects and configurations in addition to that shown in the above figures are contemplated by the present disclosure. For example, one aspect of the disclosure contemplates The aspects disclosed herein provide a system and method for scheduling data flows in time sensitive networks. A technical effect is that the above described aspects enable the efficient scheduling of data flows in time sensitive networks. For example, the above described aspects further enable trade-offs between memory size and processing speed when scheduling data flows in time sensitive networks. One advantage that can be realized in the above aspects is that the amount of memory required to save data flows and schedule information for data flows can be reduced for time sensitive networks. Another advantage that can be realized in the above aspects is that the time required to determine a schedule for a time sensitive network can be reduced. This can be of particular benefit when a real time scheduling response is required.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Various characteristics, aspects and advantages of the present disclosure can also be embodied in any permutation of aspects of the disclosure, including but not limited to the following technical solutions as defined in the enumerated aspects:

A method for a Time Sensitive Network (TSN) having a network topology comprising: determining a set of data flow permutations corresponding to the network topology; computing a respective full schedule corresponding to each data flow permutation of the set of data flow permutations; determining a respective time to compute the full schedule for each flow permutation of the set of flow permutations; determining a set of partial schedules, each partial schedule defining a portion of a respective full schedule; selecting a data flow permutation of the set of data flow permutations based on the respective time to compute the full schedule for the selected data flow permutation; and saving the selected data flow permutation to a memory.

The method of the preceding clause, further comprising: determining a first amount of memory to save each respective full schedule; and wherein the selecting a data flow permutation of the set of data flow permutations is further based on at least one of the determined respective time to compute the full schedule for the selected data flow permutation, and the first amount of memory to save the respective full schedule.

The method of any preceding clause, further comprising: determining a second amount of memory to save each respective partial schedule; and wherein the selecting a data flow permutation of the set of data flow permutations is further based at least in part on at least one of the determined respective time to compute the full schedule for the selected data flow permutation, and the second amount of memory to save the partial schedule for the selected data flow permutation.

The method of any preceding clause, wherein the selecting a data flow permutation of the set of data flow permutations is further based at least in part on at least one of a difference between the determined respective time to compute the full schedule for the selected flow permutation and a total time to compute the full schedule for the remaining flow permutations.

The method of any preceding clause, wherein the network topology comprises a set of data to determine the set of data flow permutations corresponding to the network topology.

The method of any preceding clause, further comprising assigning a hash to correlate the selected data flow permutation to a partial schedule.

The method of any preceding clause, further comprising selecting the partial schedule corresponding to the selected data flow permutation based upon the assigned hash.

The method of any preceding clause, further comprising determining the full schedule based on the selected data flow permutation and the selected partial schedule.

The method of any preceding clause, further comprising transmitting the selected data flow permutation and partial schedule from the memory to the scheduler.

The method of any preceding clause, further comprising: receiving one or more data frames; and determining a classification for each received data frame; wherein the determining a set of data flow permutations corresponding to the network topology is further based at least in part on the classification.

The method of any preceding clause, further comprising transmitting the selected data flow permutation and partial schedule from the memory to the scheduler.

The method of any preceding clause further comprising transmitting the full schedule to a device in the network topology.

The method of any preceding clause further comprising transmitting the data frames to a device in the network topology based on the selected schedule.

A Time Sensitive Network (TSN) system for controlling operations of an installed product, comprising: a TSN module operative to control operations of the installed product; a processor communicatively coupled to the TSN module; and a memory communicatively coupled to the processor, the memory storing program instructions, wherein the processor is operative with the TSN module and additional program instructions to: determine a set of data flow permutations corresponding to a network topology associated with the installed product; compute a respective full schedule corresponding to each data flow permutation of the set of data flow permutations; determine a respective time to compute a full schedule for each data flow permutation of the set of flow permutations; determine a respective partial schedule for each data flow permutation of the set of data flow permutations; select a data flow permutation of the set of data flow permutations based at least in part on the respective time to compute the full schedule for the selected data flow permutation; and save the selected data flow permutation to the memory.

The system of any preceding clause, wherein the processor is operative with the TSN module and additional program instructions to further: determine a first amount of memory to save each respective full schedule; and wherein the selecting a data flow permutation of the set of data flow permutations is based at least in part on at least one of the respective time to compute the full schedule for the selected data flow permutation, and the first amount of memory to save the respective full schedule.

The system of any preceding clause, wherein the processor is operative with the TSN module and additional program instructions to further: determine a second amount of memory to save each respective partial schedule; and wherein the selecting a data flow permutation of the set of data flow permutations is based at least in part on at least one of the respective time to compute the full schedule for the selected data flow permutation, and the second amount of memory to save the partial schedule for the selected data flow permutation.

The system of any preceding clause, wherein the processor is operative with the TSN module and additional program instructions to further: determine a respective time to compute a full schedule for each data flow permutation of the set of data flow permutations, wherein the selecting a data flow permutation of the set of data flow permutations is further based on at least one of a difference between the respective time to compute a full schedule for the selected data low permutation and a total time to compute a full schedule for the remaining data flow permutations.

The system of any preceding clause, wherein the processor is operative with the TSN module and additional program instructions to further select the partial schedule corresponding to the selected data flow permutation.

The system of any preceding clause, wherein the processor is operative with the TSN module and additional program instructions to further compute the full schedule based on the selected data flow permutation and the partial schedule.

A non-transitory computer readable medium comprising instructions that, when executed, cause a processor to at least: determine a set of data flow permutations corresponding to a network topology associated with an installed product; compute a respective full schedule corresponding to each data flow permutation of the set of data flow permutations; determine a respective time to compute a full schedule for each data flow permutation of the set of flow permutations; determine a respective partial schedule for each data flow permutation of the set of data flow permutations; select a data flow permutation of the set of data flow permutations based at least in part on the respective time to compute the full schedule for the selected data flow permutation; and save the selected data flow permutation to a memory.

What is claimed is:

1. A method for a Time Sensitive Network (TSN) having a network topology comprising:
   determining a set of data flow permutations corresponding to the network topology;
   computing a respective full schedule corresponding to each data flow permutation of the set of data flow permutations;
   determining a respective time to compute the full schedule for each flow permutation of the set of flow permutations;
   determining a set of partial schedules, each partial schedule defining a portion of a respective full schedule;
   selecting a data flow permutation of the set of data flow permutations based on the respective time to compute the full schedule for the selected data flow permutation; and
   saving the selected data flow permutation to a memory.

2. The method of claim 1, further comprising:
   determining a first amount of memory to save each respective full schedule; and
   wherein the selecting a data flow permutation of the set of data flow permutations is further based on at least one of the determined respective time to compute the full schedule for the selected data flow permutation, and the first amount of memory to save the respective full schedule.

3. The method of claim 1, further comprising:
   determining a second amount of memory to save each respective partial schedule; and
   wherein the selecting a data flow permutation of the set of data flow permutations is further based at least in part on at least one of the determined respective time to compute the full schedule for the selected data flow permutation, and the second amount of memory to save the partial schedule for the selected data flow permutation.

4. The method of claim 1, wherein the selecting a data flow permutation of the set of data flow permutations is further based at least in part on at least one of a difference between the determined respective time to compute the full schedule for the selected flow permutation and a total time to compute the full schedule for the remaining flow permutations.

5. The method of claim 1, wherein the network topology comprises a set of data to determine the set of data flow permutations corresponding to the network topology.

6. The method of claim 1, further comprising assigning a hash to correlate the selected data flow permutation to a partial schedule.

7. The method of claim 6, further comprising selecting the partial schedule corresponding to the selected data flow permutation based upon the assigned hash.

8. The method of claim 1, further comprising determining the full schedule based on the selected data flow permutation and the selected partial schedule.

9. The method of claim 1, further comprising transmitting the selected data flow permutation and partial schedule from the memory to a scheduler.

10. The method of claim 1, further comprising:
    receiving one or more data frames; and
    determining a classification for each received data frame;
    wherein the determining a set of data flow permutations corresponding to the network topology is further based at least in part on the classification.

11. The method of claim 10, further comprising transmitting the selected data flow permutation and partial schedule from the memory to the scheduler.

12. The method of claim 11 further comprising transmitting the full schedule to a device in the network topology.

13. The method of claim 12 further comprising transmitting the data frames to a device in the network topology based on the full schedule.

14. A Time Sensitive Network (TSN) system for controlling operations of an installed product, comprising:
    a TSN module operative to control operations of the installed product;
    a processor communicatively coupled to the TSN module; and
    a memory communicatively coupled to the processor, the memory storing program instructions, wherein the processor is operative with the TSN module and additional program instructions to:
    determine a set of data flow permutations corresponding to a network topology associated with the installed product;
    compute a respective full schedule corresponding to each data flow permutation of the set of data flow permutations;
    determine a respective time to compute a full schedule for each data flow permutation of the set of flow permutations;
    determine a respective partial schedule for each data flow permutation of the set of data flow permutations;
    select a data flow permutation of the set of data flow permutations based at least in part on the respective time to compute the full schedule for the selected data flow permutation; and
    save the selected data flow permutation to the memory.

15. The system of claim 14, wherein the processor is operative with the TSN module and additional program instructions to further:
    determine a first amount of memory to save each respective full schedule; and
    wherein the selecting a data flow permutation of the set of data flow permutations is based at least in part on at least one of the respective time to compute the full schedule for the selected data flow permutation, and the first amount of memory to save the respective full schedule.

16. The system of claim 15, wherein the processor is operative with the TSN module and additional program instructions to further:

determine a second amount of memory to save each respective partial schedule; and wherein the selecting a data flow permutation of the set of data flow permutations is based at least in part on at least one of the respective time to compute the full schedule for the selected data flow permutation, and the second amount of memory to save the partial schedule for the selected data flow permutation.

17. The system of claim 15, wherein the processor is operative with the TSN module and additional program instructions to further:

determine a respective time to compute a full schedule for each data flow permutation of the set of data flow permutations, wherein the selecting a data flow permutation of the set of data flow permutations is further based on at least one of a difference between the respective time to compute a full schedule for the selected data low permutation and a total time to compute a full schedule for the remaining data flow permutations.

18. The system of claim 15, wherein the processor is operative with the TSN module and additional program instructions to further select the partial schedule corresponding to the selected data flow permutation.

19. The system of claim 18, wherein the processor is operative with the TSN module and additional program instructions to further compute the full schedule based on the selected data flow permutation and the partial schedule.

20. A non-transitory computer readable medium comprising instructions that, when executed, cause a processor to at least:

determine a set of data flow permutations corresponding to a network topology associated with an installed product;

compute a respective full schedule corresponding to each data flow permutation of the set of data flow permutations;

determine a respective time to compute a full schedule for each data flow permutation of the set of flow permutations;

determine a respective partial schedule for each data flow permutation of the set of data flow permutations;

select a data flow permutation of the set of data flow permutations based at least in part on the respective time to compute the full schedule for the selected data flow permutation; and save the selected data flow permutation to a memory.

* * * * *